United States Patent
Lee et al.

(10) Patent No.: US 7,435,483 B2
(45) Date of Patent: Oct. 14, 2008

(54) PROCESS FOR COATING PAPER, PAPERBOARD, AND MOLDED FIBER WITH A WATER-DISPERSIBLE POLYESTER POLYMER

(75) Inventors: Robert A. Lee, Bowdon (GB); Gerald A. Hutchinson, Coto de Caza, CA (US); Charles P. Klass, Radnor, PA (US)

(73) Assignee: Advanced Plastics Technologies Luxembourg S.A., Grand-Duchy of Luxembourg (LU)

( * ) Notice: Subject to any disclaimer, the term of this patent is extended or adjusted under 35 U.S.C. 154(b) by 521 days.

(21) Appl. No.: 10/473,655

(22) PCT Filed: Apr. 4, 2002

(86) PCT No.: PCT/US02/11092

§ 371 (c)(1),
(2), (4) Date: Oct. 2, 2003

(87) PCT Pub. No.: WO02/081818

PCT Pub. Date: Oct. 17, 2002

(65) Prior Publication Data

US 2004/0131871 A1    Jul. 8, 2004

Related U.S. Application Data

(60) Provisional application No. 60/281,549, filed on Apr. 4, 2001, provisional application No. 60/299,916, filed on Jun. 20, 2001.

(51) Int. Cl.
*B32B 27/04* (2006.01)
*B32B 27/10* (2006.01)
*B32B 27/12* (2006.01)
*B32B 27/36* (2006.01)
*B05D 3/00* (2006.01)

(52) U.S. Cl. .................... 428/481; 428/480; 428/537.1; 428/537.5; 442/64; 442/71; 442/85; 427/314; 427/316; 427/322; 427/324; 427/326; 427/372.2; 427/374.1; 427/384; 427/385.5; 427/389.9; 427/391; 427/392; 427/393; 427/394; 427/396; 427/398.1

(58) Field of Classification Search ...................... None
See application file for complete search history.

(56) References Cited

U.S. PATENT DOCUMENTS 3,129,133 A    4/1964    Doyle et al.

(Continued)

FOREIGN PATENT DOCUMENTS

EP    0 274 355 A2    12/1987

(Continued)

OTHER PUBLICATIONS

Schimtz, Peter et al., "Films." Ullmann's Encyclopedia of Industrial Chemistry, 5th Ed., vol. A11 (1988), pp. 85-95, 108-110.*
International Search Report for PCT/US02/11092, (Jun. 2, 2003).

*Primary Examiner*—Vivian Chen
(74) *Attorney, Agent, or Firm*—Knobbe, Martens, Olson & Bear, LLP.

(57) ABSTRACT

Disclosed are coated fiber-containing articles, including paper, paperboard, and molded fiber, and methods for preparing such articles. A preferred method comprises heating paperboard containing a polymeric binder to a temperature sufficient to remove at least some moisture from the paperboard; applying an aqueous dispersion or solution of at least one water-dispersible or water-soluble polymer to the paperboard product; heating the paperboard to at least partially cure the water-dispersible or water-soluble polymer; and cooling the paperboard to at least 160° F. to reduce the tackiness of the cured water-dispersible polymer.

25 Claims, 7 Drawing Sheets

U.S. PATENT DOCUMENTS

| | | | |
|---|---|---|---|
| 3,305,528 A | 2/1967 | Wynstra et al. | |
| 3,462,383 A | 8/1969 | Langoria et al. | |
| 3,819,541 A | 6/1974 | Longoria, III et al. | |
| 3,932,363 A | 1/1976 | Lehmann et al. | |
| 4,001,156 A | 1/1977 | Bosso et al. | |
| 4,069,210 A | 1/1978 | Schimmel | |
| 4,250,211 A | 2/1981 | Damrau et al. | |
| 4,267,301 A | 5/1981 | Olsen et al. | |
| 4,340,519 A * | 7/1982 | Kotera et al. | 523/414 |
| 4,383,101 A | 5/1983 | Olsen et al. | |
| 4,396,649 A | 8/1983 | Bailey et al. | |
| 4,704,437 A | 11/1987 | Kiessling | |
| 4,717,743 A | 1/1988 | Wakabayashi et al. | |
| 4,764,397 A | 8/1988 | Fischer et al. | |
| 4,937,145 A | 6/1990 | McReynolds | |
| 5,068,139 A | 11/1991 | McReynolds | |
| 5,089,588 A | 2/1992 | White et al. | |
| 5,115,075 A | 5/1992 | Brennan et al. | |
| 5,143,998 A | 9/1992 | Brennan et al. | |
| 5,149,768 A | 9/1992 | White et al. | |
| 5,164,472 A | 11/1992 | White et al. | |
| 5,171,820 A | 12/1992 | Mang et al. | |
| 5,179,130 A | 1/1993 | Bland et al. | |
| 5,188,888 A | 2/1993 | McReynolds | |
| 5,218,075 A | 6/1993 | Brennan et al. | |
| 5,246,751 A | 9/1993 | White et al. | |
| 5,275,853 A | 1/1994 | Silvis et al. | |
| 5,288,772 A | 2/1994 | Hon | |
| 5,464,924 A | 11/1995 | Silvis et al. | |
| 5,466,794 A | 11/1995 | Kalbe et al. | |
| 5,472,753 A * | 12/1995 | Farha | 428/35.7 |
| 5,552,495 A * | 9/1996 | Miller et al. | 525/437 |
| 5,604,078 A | 2/1997 | Campbell et al. | |
| 5,723,522 A | 3/1998 | Bergmann | |
| 5,731,094 A * | 3/1998 | Brennan et al. | 428/474.4 |
| 5,759,680 A | 6/1998 | Brooks et al. | |
| 5,767,177 A | 6/1998 | Omente et al. | |
| 5,780,519 A | 7/1998 | Imoto | |
| 5,786,092 A * | 7/1998 | Lorenzo et al. | 428/423.1 |
| 5,814,373 A | 9/1998 | White et al. | |
| 5,827,607 A | 10/1998 | Deaner et al. | |
| 5,827,905 A | 10/1998 | Grigat et al. | |
| 5,834,078 A * | 11/1998 | Cavitt et al. | 428/35.7 |
| 5,952,105 A | 9/1999 | Medoff et al. | |
| 5,962,093 A | 10/1999 | White et al. | |
| 5,973,035 A | 10/1999 | Medoff et al. | |
| 6,011,111 A * | 1/2000 | Brennan et al. | 524/601 |
| 6,051,294 A | 4/2000 | White et al. | |
| 6,106,944 A | 8/2000 | Heikkila et al. | |
| 6,113,981 A * | 9/2000 | Ogilvie et al. | 427/223 |
| 6,156,806 A * | 12/2000 | Piechocki et al. | 516/64 |
| 6,156,835 A * | 12/2000 | Anderson et al. | 524/445 |
| 6,171,444 B1 * | 1/2001 | Nigam | 162/158 |
| 6,180,715 B1 | 1/2001 | Schmidt | |
| 6,528,546 B2 * | 3/2003 | Lee et al. | 521/48 |
| 6,656,858 B1 | 12/2003 | Cahill | |
| 2001/0005550 A1 | 6/2001 | Bengtsson et al. | |
| 2002/0009937 A1* | 1/2002 | Dukes et al. | 442/156 |
| 2002/0100566 A1* | 8/2002 | Lee et al. | 162/166 |
| 2002/0127358 A1 | 9/2002 | Berlin et al. | |
| 2003/0069340 A1* | 4/2003 | Beckerdite et al. | 524/284 |
| 2003/0220036 A1* | 11/2003 | Lee et al. | 442/153 |

FOREIGN PATENT DOCUMENTS

| | | |
|---|---|---|
| EP | 0 868 485 B1 | 10/2000 |
| EP | 1 041 116 A2 | 10/2000 |
| GB | 1 234 235 | 6/1971 |
| WO | WO 96/20966 | 7/1996 |
| WO | WO 97/23564 | 7/1997 |
| WO | WO 97/30103 | 8/1997 |
| WO | WO 98/14498 | 4/1998 |
| WO | WO 98/17470 | 4/1998 |
| WO | WO 98/29491 | 7/1998 |
| WO | WO 99/12995 | 3/1999 |
| WO | WO 99/20673 | 4/1999 |
| WO | WO 99/23134 | 5/1999 |
| WO | WO 99/32281 | 7/1999 |
| WO | WO 99/48962 | 9/1999 |
| WO | WO 99/51425 | 10/1999 |
| WO | WO 00/01750 | 1/2000 |
| WO | WO 00/20484 | 4/2000 |
| WO | WO 00/32854 | 6/2000 |
| WO | WO 00/55250 | 9/2000 |
| WO | WO 00/69960 | 11/2000 |
| WO | WO 01/09220 A1 | 2/2001 |
| WO | WO 01/45941 | 6/2001 |
| WO | WO 01/46303 A1 | 6/2001 |
| WO | WO 01/46305 | 6/2001 |
| WO | WO 01/465523 * | 6/2001 |

* cited by examiner

Schematic illustrating aspects of typical "puddle" size press

Schematic illustrating aspects of typical metering size press

Schematic illustrating various types of roll coaters

Schematic illustrating Blade and Air Knife Coaters

Schematic illustrating simple Short Dwell Coater

PROCESS FOR COATING PAPER, PAPERBOARD, AND MOLDED FIBER WITH A WATER-DISPERSIBLE POLYESTER POLYMER

RELATED APPLICATION INFORMATION

This application claims priority to International Application No. PCTUS02/11092 filed on Apr. 4, 2002, which claims priority to U.S. Provisional Application Ser. Nos. 60/281,549 filed Apr. 4, 2001 and 60/299,916 filed Jun. 20, 2001, the disclosures of which are hereby incorporated by reference in their entireties.

BACKGROUND OF THE INVENTION

1. Field of the Invention

This invention relates to a method and apparatus for coating polymer impregnated paperboard and, more specifically, a method and apparatus for producing coated paperboard products with a low permeability to vapors and gases, excellent glueability, printability, and recyclability.

2. Description of the Related Art

Corrugated board is a converted or remanufactured paper product. It is a layered structure that is usually die cut to form corrugated containers. It consists of a fluted corrugated medium sandwiched between sheets of linerboard. The simplest three-ply structure is known as "double face." As recently as 1990, much of the linerboard was made entirely from virgin, long-fibred, softwood, kraft pulp. Today, however, these board grades contain sizeable portions of recycled old corrugated containers (OCC) and many are made from 100% OCC.

Around the world, landfill space for waste disposal is rapidly reaching capacity. By the year 2005, paper and paperboard products are projected to represent 41 percent of the municipal solid waste stream and may climb to nearly 42 percent by 2010. New governmental regulations and the public's increasing concern for the environment have created pressure to remove these materials from the solid waste stream. The most widely utilized method of reducing paper waste is recycling.

OCC has a history of efficient recycling use. Even before the era of government mandates and self-imposed industry goals, almost 50% of OCC was recycled in North America. Today's recovery rate is about 62%. It is expected that a level of 70% will be achieved by the year 2000. Today, most of this recycled material goes directly from retail chain stores to mills based on long-term contracts. The rest comes from municipal curbside collection and wastepaper dealers. Some OCC is used in the production of boxboard, and some is even bleached and used in the production of fine paper, but most OCC is used again to produce corrugating medium and linerboard in the production of boxboard, and some is even bleached and used in the production of fine paper, but most OCC is used again to produce corrugating medium and linerboard.

"Repulping" refers to any mechanical action that disperses dry or compacted pulp fibers into a water slush, slurry or suspension. The action can be just sufficient to enable the slurry to be pumped, or it can be adequate to totally separate and disperse all the fibers. In a typical recycling process, bales of OCC are fed into a repulper where the material is disintegrated and the gross contaminants are removed. The resulting stock is pumped through pressure screens and cyclonic cleaners to remove oversized materials and foreign matter. Plastics, styrofoam or other lightweight contaminants are removed by reverse cleaners. The glue, staples, wax, and tapes originally used to assemble the corrugated box should also be removed.

Untreated OCC usually creates no problems for recycling. However, paperboard is often treated or coated to enhance its performance and these coatings render the paper unrecyclable. For example, corrugated paperboard is often treated with a curtain coating, wax impregnation, lamination, sizing, or a water-based coating to reduce abrasiveness and to provide for oil and moisture resistance. While coatings such as wax enhance the moisture resistant properties of the paperboard, the wax coating process is expensive and often renders the paperboard unrecyclable.

While various coatings have been introduced in the market to provide a recyclable coating, they suffer from limitations such as printability and gluablity. Some repulpable coatings cannot be printed over due to a high degree of water resistance or the release characteristics of the coating. While some repulpable coatings may be printable, they require special inks. More detrimentally, many currently available repulpable paperboard coatings are not compatible with all glues. For example, some coatings are compatible only with hot-melt adhesives only, while others, by nature of their heat-resistant and oil-resistant properties, repel the oil-based hot-melt adhesives.

Moisture vapor transfer rate (MVTR) is a scientific measurement used to describe a product's ability to allow moisture vapor to pass through it, over a specific time period, at a controlled temperature and at a designated atmospheric pressure. Products as diverse as frozen meat patties and fine papers are extremely sensitive to moisture gain or loss. In the case of meat patties, excessive loss of moisture while product is being held in a freezer results in "freezer burn." Freezer burn is unsightly and adversely affects the taste of the cooked meat. For fine papers, excessive moisture gain results in limp, hard-to-process sheets. Traditional solutions generally involve plastic film, either as a laminate with the paper or as a bag around the product. Both solutions are expensive or incur added labor costs, and greatly reduce or eliminate the recyclability of the shipping container.

Hydroxy-phenoxyether polymers are known, see e.g. U.S. Pat. Nos. 6,011,111; 5,834,078; 5,814,373; 5,464,924; and 5,275,853; see also PCT Publication Nos. WO 99/48962; WO 99/12995; WO 98/29491; and WO 98/14498. However, these disclosures do not address the aforementioned problems.

SUMMARY OF THE INVENTION

The inventors have discovered that hydroxy-phenoxyether polymers may be used to provide paper with various desirable properties, such as increased reduced vapor permeation, sizing and/or strength. This benefits the papermaker by providing a new category of polymers suitable for use in papermaking. Such materials may also be used in molded fiber applications. The papermaker may use these polymers as an alternative to, or in conjunction with, existing papermaking additives. Additionally, polyester materials, especially those that are water-dispersible, water-soluble, and/or water-biodegradable may also be used in conjunction with the aforementioned hydroxy-phenoxyether polymers to provide additional beneficial properties to paper, paper goods, and molded fiber articles. Manufacturers of paper-containing goods also benefit by gaining access to a new type of paper for incorporation into various manufactured articles. The consumer who purchases these products benefits when the paper provides improved properties that increase the consumer's enjoyment of the product, or when the paper provides suitable properties at an acceptable cost. Finally, all of humanity benefits when the manufacture of the paper is more efficient and less polluting, and when the paper-containing product is recyclable.

In preferred embodiments, the coating system reduces the vapor permeation of the paperboard product while still allowing the product to be recycled and/or is compatible with a broad range of printing and gluing systems. The coating system, in preferred embodiments, provides fiber-containing articles (whether paper-based or molded fiber) having at least one surface which is formed from a polyester which is preferably approved for being in contact with food. Additionally, such articles may also have increased water resistance, strength, and other desirable properties. The foregoing are provided by a method for producing coated paperboard with a low MVTR, excellent glueability, printability, and/or recyclability.

In preferred embodiments, the process disclosed herein also comprises the addition of a solution or dispersion of a hydroxy-phenoxyether polymer to the paperboard as either a coating or as a binder or sizing added during the papermaking process (or during the process of making the molded fiber), a heating means, coating or contour coating means for applying a water-dispersible (or water-soluble) polymer to at least one surface of the paperboard product, drying means for drying and/or curing the coating, and optionally a cooling means for reducing the temperature of the coating on the paperboard product. In a related preferred embodiment, the process may be done in two distinct steps: a first step in which the hydroxy-phenoxyether polymer is added or coated upon the paper or fiber, and a second step in which the polyester coating is applied to an already formed paper sheet or article or a molded fiber article.

In accordance with one embodiment, there is provided a continuous process for forming a hydroxy-phenoxyether polymer modified paperboard coated with a polyester polymer in an aqueous dispersion. The process comprises impregnating or coating a paperboard with a solution, dispersion, or extruded coating of a hydroxy-phenoxyether polymer; heating the coated or impregnated paperboard for a sufficient time and temperature to reduce the moisture content; applying an aqueous dispersion of a water-dispersible polyester resin to at least one surface of the paperboard, and distributing the aqueous dispersion across the paperboard to remove excess dispersion and produce a generally uniform layer of the aqueous dispersion on said surface; heating said paperboard to at least partially cure said polyester; and cooling the paperboard to at least 160° F. to reduce the tackiness of said partially cured polyester.

In accordance with another embodiment, there is provided a process for forming a coated article. The process comprises providing an article comprising fiber and hydroxy-phenoxyether polymer; applying an aqueous dispersion with a water-dispersible polyester resin to at least one surface of the article, and heating said article to a temperature and for a time sufficient to at least partially cure said polyester and/or dry said aqueous dispersion of said polyester. In a preferred embodiment, the process further comprises cooling the heated article to at least about 160° F. to reduce the tackiness of said partially cured polyester.

In accordance with another embodiment, there is provided a process for forming a hydroxy-phenoxyether polymer modified articles coated with a polyester polymer. The process comprises impregnating or coating an article with a solution, dispersion, or extruded coating of a hydroxy-phenoxyether polymer; heating the article for a sufficient time and temperature to reduce the moisture content to the desired level; applying an aqueous dispersion of a water-dispersible polyester resin to at least one surface of the article; and heating said article to a temperature and for a time sufficient to at least partially cure said polyester and/or dry said aqueous dispersion of the polyester.

In accordance with another embodiment, there is provided an article, comprising a substrate comprising fiber and hydroxy-phenoxyether polymer, said substrate having a layer of a polyester on at least one surface thereof. In preferred embodiments, the substrate comprising fiber and hydroxy-phenoxyether polymer is selected from the group consisting of molded fiber coated with hydroxy-phenoxyether polymer, molded fiber impregnated with hydroxy-phenoxyether polymer, paper coated with hydroxy-phenoxyether polymer, and paper impregnated with hydroxy-phenoxyether polymer, and the layer of polyester is formed by coating said surface with an aqueous dispersion of a water-dispersible polyester resin.

DETAILED DESCRIPTION OF THE PREFERRED EMBODIMENTS

Figure 1:
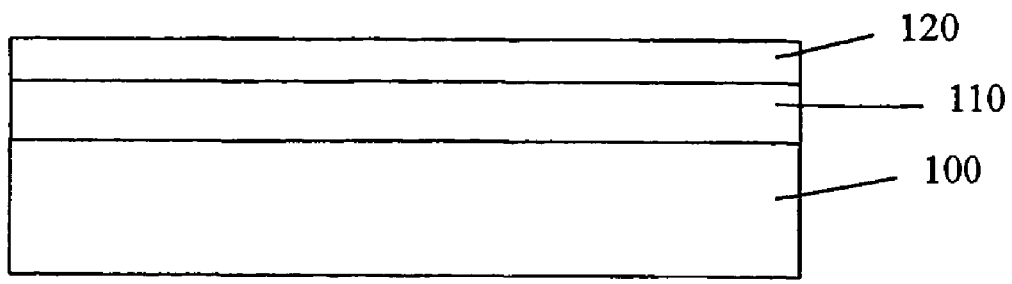
FIG. 1 is a cross-section of a coated substrate according to one preferred embodiment.

The preferred embodiments relate to paper, including paperboard, molded fiber and other fiber-containing materials, comprising hydroxy-phenoxyether polymer and polyester and methods of making such paper. The term "paper," as used herein, is a broad term and is used in its ordinary sense to include, without limitation, all manner of processed or molded cellulosic materials and thus includes all types of paper products produced from a cellulosic pulp slurry, including without limitation intermediate paper fiber products, finished products such as thin sheets of paper used for documents, books, newspapers, magazines and the like and heavier grades of paper such as cardboard, multi-ply paper, paper laminates, coated paper, corrugated paper, molded paper, and paper used for packaging, shipping containers and the like, without limitation. The term "pulp slurry," as used herein, is a broad term and is used in its ordinary sense to include, without limitation, an aqueous slurry containing cellulose or cellulosic fiber derived from a plant or wood pulping process or paper recycling process, regardless of whether such cellulose is derived from plants such as cotton or from hardwood or softwood or combinations thereof, and regardless of whether the pulping process(es) employed to provide such slurry is categorized as a mechanical or chemical or secondary or hybrid pulping process, or whether the slurry is derived from a plurality of types of pulping processes, and regardless of whether or not the pulp, or part of the pulp, has been bleached.

As used herein, "paperboard" refers to a web of cellulosic fibers in sheet form. The paperboard used in preferred embodiments generally may be any paperboard suitable for folding cartons or corrugated board or as a substrate for laminating to a backing such as gypsum board. The term paperboard includes paper and paperboard of different thicknesses. One preferred paperboard is virgin kraft paperboard of a weight known as liner board. As is well known in the art, kraft paperboard is produced by a chemical cooking process using sodium hydroxide and sodium sulfide, and there are many different types of kraft paperboard manufactured with various additives and treatments for various applications. The methods and products produced by such methods may also make use of reprocessed paperboard, that is, not virgin kraft paperboard.

The term "hydroxy-phenoxyether polymer," as used herein, is a broad term and is used in its ordinary sense to include, without limitation, a polymer having aromatic ether moieties in its backbone chain and pendant hydroxyl groups, see e.g. U.S. Pat. No. 6,011,111 (incorporated herein by reference in its entirety). Preferred hydroxy-phenoxyether polymers are as follows:

(1) hydroxy-functional poly(amide ethers) having repeating units represented by any one of the Formulae Ia, Ib or Ic:

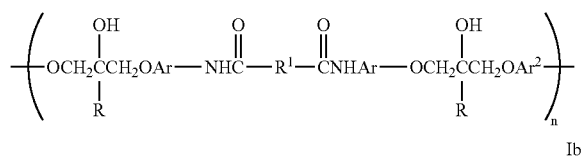

Ia

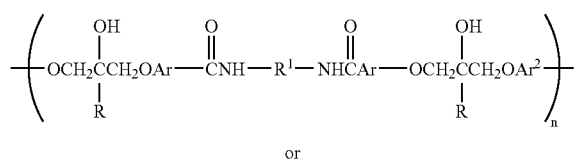

Ib or

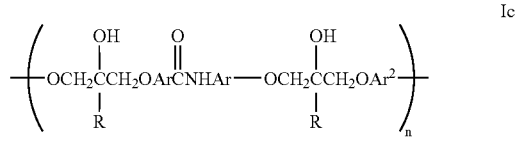

Ic (2) poly(hydroxy amide ethers) having repeating units represented independently by any one of the Formulae IIa, IIb or IIc:

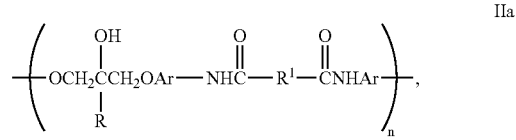

IIa

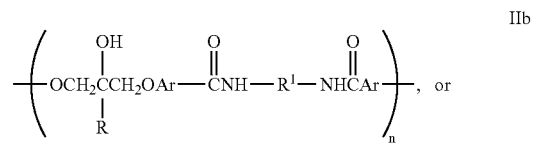

IIb or

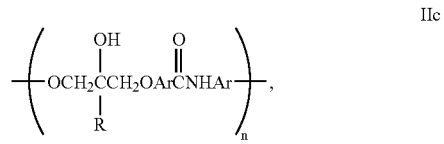

IIc (3) amide- and hydroxymethyl-functionalized polyethers having repeating units represented by Formula III:

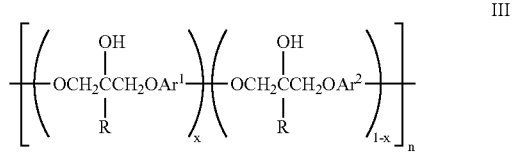

III (4) hydroxy-functional polyethers having repeating units represented by Formula IV:

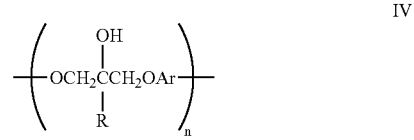

IV (5) hydroxy-functional poly(ether sulfonamides) having repeating units represented by Formulae Va or Vb:

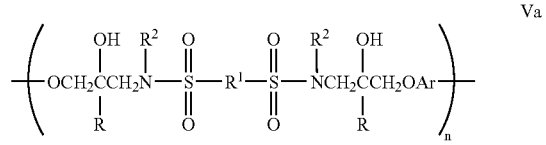

Va

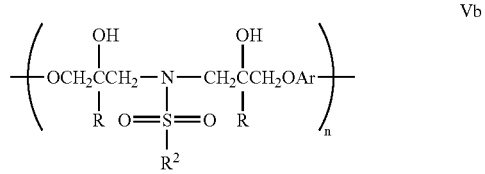

Vb (6) poly(hydroxy ester ethers) having repeating units represented by Formula VI:

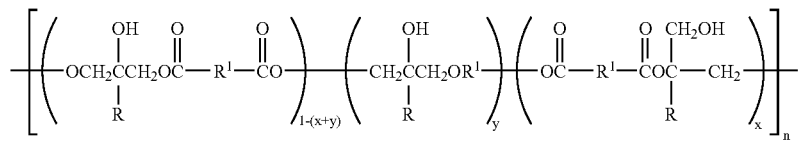

(7) hydroxy-phenoxyether polymers having repeating units represented by Formula VII:

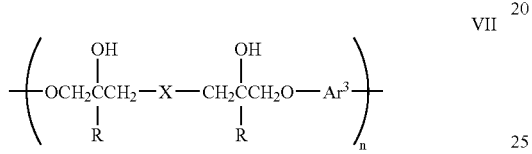

and (8) poly(hydroxyamino ethers) having repeating units represented by Formula VIII:

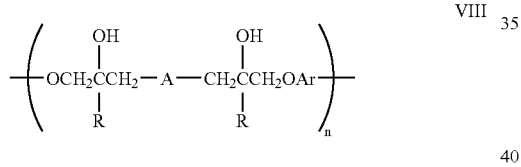

wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each Ar1 is a divalent aromatic moiety or combination of divalent aromatic moieties bearing amide or hydroxymethyl groups; each Ar2 is the same or different than Ar and is individually a divalent aromatic moiety, substituted aromatic moiety or heteroaromatic moiety or a combination of different divalent aromatic moieties, substituted aromatic moieties or heteroaromatic moieties; R1 is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; R2 is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and Ar3 is a "cardo" moiety represented by any one of the Formulae:

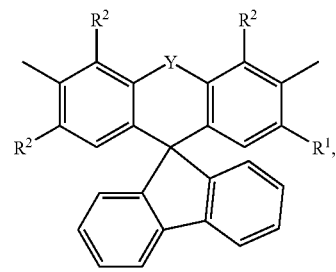

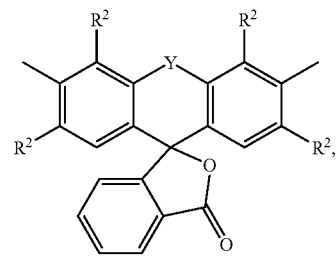

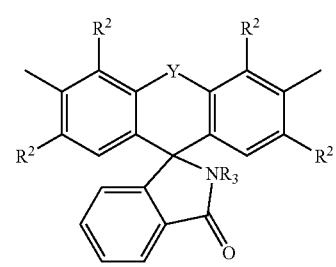

wherein Y is nil, a covalent bond, or a linking group, wherein suitable linking groups include, for example, an oxygen atom, a sulfur atom, a carbonyl atom, a sulfonyl group, or a methylene group or similar linkage; R1 and R2 are independently hydrogen, halogen, a hydrocarbyl or substituted hydrocarbyl, wherein hydrocarbyl is a monovalent hydrocarbon such as alkyl, cycloalkyl, aralkyl, or aryl and the substituent(s) is a monovalent moiety which is inert in the reactions used to prepare the polymer; and R3 is hydrogen, a hydrocarbyl or substituted hydrocarbyl wherein hydrocarbyl is as defined previously and the substituent(s) is also as defined previously. Examples of such substituents include hydroxy, cyano and halo moieties. Preferably, n is an integer from about 10 to about 1000; x is 0.01 to 1.0; and y is 0 to 0.5.

The term "predominantly hydrocarbylene," as used herein, means a divalent radical that is predominantly hydrocarbon, but which optionally contains a small quantity of a heteroatomic moiety such as oxygen, sulfur, imino, sulfonyl, sulfoxyl, and the like.

The hydroxy-functional poly(amide ethers) represented by Formula I may be prepared by contacting an N,N'-bis(hydroxyphenylamido)alkane or arene with a diglycidyl ether as described in U.S. Pat. Nos. 5,089,588 and 5,143,998 (both incorporated herein by reference in their entirety).

The poly(hydroxy amide ethers) represented by Formula II may be prepared by contacting a bis(hydroxyphenylamido)alkane or arene, or a combination of 2 or more of these compounds, such as N,N'-bis(3-hydroxyphenyl) adipamide or N,N'-bis(3-hydroxyphenyl)glutaramide, with an epihalohydrin as described in U.S. Pat. No. 5,134,218 (incorporated herein by reference in its entirety).

The amide- and hydroxymethyl-functionalized polyethers represented by Formula III can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075 (both incorporated herein by reference in their entirety).

The hydroxy-functional polyethers represented by Formula IV can be prepared, for example, by allowing a diglycidyl ether or combination of diglycidyl ethers to react with a dihydric phenol or a combination of dihydric phenols using the process described in U.S. Pat. No. 5,164,472. Alternatively, the hydroxy-functional polyethers may be obtained by allowing a dihydric phenol or combination of dihydric phenols to react with an epihalohydrin by the process described by Reinking, Barnabeo and Hale in the Journal of Applied Polymer Science, Vol. 7, p. 2135 (1963) (both the patent and journal article of this paragraph are incorporated herein by reference in their entirety).

The hydroxy-functional poly(ether sulfonamides) represented by Formula V may be prepared, for example, by polymerizing an N,N'-dialkyl or N,N'-diaryldisulfonamide with a diglycidyl ether as described in U.S. Pat. No. 5,149,768 (incorporated herein by reference in its entirety).

The poly(hydroxy ester ethers) represented by Formula VI may be prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820 (incorporated herein by reference in its entirety).

The hydroxy-phenoxyether polymers represented by Formula VII may be prepared, for example, by contacting at least one dinucleophilic monomer with at least one diglycidyl ether of a cardo bisphenol, such as 9,9-bis(4-hydroxyphenyl)fluorene, phenolphthalein, or phenolphthalimidine or a substituted cardo bisphenol, such as a substituted bis(hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. Pat. No. 5,814,373 (incorporated herein by reference in its entirety).

The poly(hydroxyamino ethers) ("PHAE" or polyetheramines) represented by Formula VII may be prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. Examples of polymers of this type are described in U.S. Pat. No. 5,275,853 (incorporated herein by reference in its entirety).

Thermoplastic phenoxy materials suitable for use in the preferred embodiments include those commercially available from Phenoxy Associates, Inc. These hydroxy-phenoxyether polymers are preferably the condensation reaction products of a dihydric polynuclear phenol, such as bisphenol A, and an epihalohydrin and have the repeating units represented by Formula IV wherein Ar is an isopropylidene diphenylene moiety. A process for preparing these polymers is described in U.S. Pat. No. 3,305,528 (incorporated herein by reference in its entirety).

Phenoxy-type thermoplastics of Formulae I-VIII may be obtained commercially from. Dow Chemical Company (Midland, Mich. U.S.A.). The most preferred hydroxy-phenoxyether polymers are the poly(hydroxyamino ethers) ("PHAE" or polyetheramines) represented by Formula VIII, such as XU19040.00L or BLOX 0005 available from The Dow Chemical Company.

Preferred embodiments provide paper comprising an amount of hydroxy-phenoxyether polymer that is effective to provide the paper with an increase in sizing or strength. In a more preferred embodiment, the hydroxy-phenoxyether polymer is a polyetheramine. Preferred polyetheramines include hydroxy-phenoxyether polymer resins (or PHAE (poly hydroxy amino ether) resins) sold as Blox® resins by The Dow Chemical Company (Midfield, Mich.). Preferred polymers, including the salts and dispersions of the polymers, are also described in U.S. Pat. Nos. 5,834,078, 5,275,853 and 6,180,715, all of which are hereby incorporated by reference in their entireties.

In preferred embodiments, the aforementioned increase in strength is an increase in wet tensile strength, dry tensile strength, wet flexural strength and/or dry flexural strength, and/or the aforementioned increase in sizing is an increase in Cobb sizing, as manifested by a decrease in Cobb value. In preferred embodiments, the paper is readily recyclable, such as is described in PCT Publication No. WO 01/46305.

One preferred method of making such hydroxy-phenoxyether polymer-containing paper is by a papermaking process comprising: providing a pulp slurry or paper web, providing a solution or dispersion comprised of a hydroxy-phenoxyether polymer, intermixing the solution or dispersion with the pulp slurry or paper web to form an admixture, and forming paper from the admixture, wherein the hydroxy-phenoxyether polymer is used in an amount that is effective to provide the paper with an increase in sizing or strength. In a more preferred embodiment, the pH of the admixture is adjusted, to precipitate a least a portion of the hydroxy-phenoxyether polymer and/or to be in the range of about 4 to about 7.

Another preferred method of making such hydroxy-phenoxyether polymer-containing paper is by a coating process comprising providing a paper, providing a solution or dispersion comprised of a hydroxy-phenoxyether polymer, applying the solution or dispersion to at least a portion of the paper to form a wet paper, and drying the wet paper to form a coated paper. In a further preferred embodiment, this process further comprises forming a wet laminate by bringing the wet paper or the coated paper into contact with a solid material, a second solution or dispersion comprised of a hydroxy-phenoxyether polymer, or a mixture thereof, and drying the wet laminate to form a laminate. In still another preferred embodiment, a laminate is provided, comprised of hydroxy-phenoxyether polymer, at least one layer comprised of paper, and at least one layer comprised of a second paper or a solid non-paper material.

Fiber-containing articles comprising hydroxy-phenoxyether polymer may also be made by non-aqueous techniques such as lamination, extrusion, and/or those described in PCT Publication No. WO 01/45941. Additional details regarding the making of paper and molded fiber articles comprising hydroxy-phenoxyether polymer can be found hereinbelow.

In a preferred embodiment, a process for making a coated paper comprising both hydroxy-phenoxyether and polyester is provided. Preferred processes comprise providing a paper containing or coated with hydroxy-phenoxyether polymer, preferably made by the methods noted above, followed by applying a coating of a solution or a dispersion of an FDA compliant coating material to at least a portion of the hydroxy-phenoxyether impregnated or coated paper. The polyester coating may be applied in a single process with the first coating, following a complete or partial drying or curing of the hydroxy-phenoxyether impregnated or coated paper or it may be applied to such hydroxy-phenoxyether impregnated or coated paper which has been previously formed during a separate process. The application of the polyester coating preferably serves to render the structure suitable for direct food contact applications.

Similarly, hydroxy-phenoxyether polymer coated or impregnated molded fiber articles may also be coated with a solution or dispersion, preferably in water, of a polyester material, preferably an FDA compliant material, in a manner similar to that discussed above.

The coating composition used to coat paper or paperboard or molded fiber comprising the hydroxy-phenoxyether polymer according to preferred embodiments is a water-dispersible polymer suspension of a polyester resin; preferably, polyethylene terephthalate (PET). Other polyesters, including copolyesters and barrier polyesters and copolyesters may also be used.

A preferred water-dispersible polymer is a water-soluble or water-dispersible polyester resin as described in U.S. Pat. No. 4,977,191 (Salsman), incorporated herein by reference. More specifically, U.S. Pat. No. 4,977,191 describes a water-soluble or water-dispersible polyester resin, comprising a reaction product of 20-50% by weight of waste terephthalate polymer, 10-40% by weight of at least one glycol and 5-25% by weight of at least one oxyalkylated polyol.

Another preferred water-dispersible polymer is a sulfonated water-soluble or water dispersible polyester resin composition as described in U.S. Pat. No. 5,281,630 (Salsman), incorporated herein by reference. Specifically, U.S. Pat. No. 5,281,630 describes an aqueous suspension of a sulfonated water-soluble or water dispersible polyester resin comprising a reaction product of 20-50% by weight terephathlate polymer, 10-40% by weight at least one glycol and 5-25% by weight of at least one oxyalkylated polyol to produce a prepolymer resin having hydroxyalkyl functionality, wherein the prepolymer resin is further reacted with about 0.10 mole to about 0.50 mole of an alpha, beta-ethylenically unsaturated dicarboxylic acid per 100 g of prepolymer resin and a thus produced resin, terminated by a residue of an alpha, beta-ethylenically unsaturated dicarboxyclic acid, is reacted with about 0.5 mole to about 1.5 mole of a sulfite per mole of alpha, beta-ethylenically unsaturated dicarboxylic acid residue to produce a sulfonated-terminated resin.

Yet another preferred water-dispersible polymer is the coating described in U.S. Pat. No. 5,726,277 (Salsman), incorporated herein by reference. Specifically, U.S. Pat. No. 5,726,277 describes coating composition comprising a reaction product of at least 50% by weight of a waste terephthalate polymer and a mixture of glycols including an oxyalkylated polyol in the presence of a glycolysis catalyst wherein the reaction product is further reacted with a difunctional, organic acid and wherein the weight ratio of acid to glycols is in the range of 6:1 to 1:2.

While the above examples are provided as the preferred water-dispersible polymer coating compositions, other water-dispersible polymers are suitable for use in the products and methods described herein. By way of example only, and not meant to be limiting, further suitable water-dispersible compositions are described in U.S. Pat. No. 4,104,222 (Date, et al.), incorporated herein by reference. U.S. Pat. No. 4,104,222 describes a dispersion of a linear polyester resin obtained by mixing a linear polyester resin with a higher alcohol/ethylene oxide addition type surface-active agent, melting the mixture and dispersing the resulting melt by pouring it into an aqueous solution of an alkali under stirring. Specifically, this dispersion is obtained by mixing a linear polyester resin with a surface-active agent of the higher alcohol/ethylene oxide addition type, melting the mixture, and dispersing the resulting melt by pouring it into an aqueous solution of an alkanolamine under stirring at a temperature of 70-95° C., said alkanolamine being selected from the group consisting of monoethanolamine, diethanolamine, triethanolamine, monomethylethanolamine, monoethylethanolamine, diethylethanolamine, propanolamine, butanolamine, pentanolamine, N-phenylethanolamine, and an alkylolamine of glycerine, said alkanolamine being present in the aqueous solution in an amount of 0.2 to 5 weight percent, said surface-active agent of the higher alcohol/ethylene oxide addition type being an ethylene oxide addition product of a higher alcohol having an alkyl group of at least 8 carbon atoms, an alkyl-substituted phenol or a sorbitan monoacylate and wherein said surface-active agent has an HLB value of at least 12.

Likewise, by way of example, U.S. Pat. No. 4,528,321 (Allen) discloses a dispersion in a water immiscible liquid of water soluble or water swellable polymer particles and which has been made by reverse phase polymerization in the water immiscible liquid and which includes a non-ionic compound selected from $C_{4-12}$ alkylene glycol monoethers, their $C_{1-4}$ alkanoates, $C_{6-12}$ polyalkylene glycol monoethers and their $C_{1-4}$ alkanoates.

In addition to the materials noted above, another preferred class of materials for the polyester coating layer on the hydroxy-phenoxyether impregnated or coated paper or molded fiber are the hydrobiodegradable polyester coatings and films sold by DuPont (E.I. du Pont de Nemours and Company) under the name Biomax®.

It will be understood by those in the art that the various coatings will have varying heat tolerances and tensile strengths, which relate directly to the polymer used in the coating. Accordingly, obvious alterations of the methods disclosed herein are contemplated in order to accommodate the various materials which may be used.

The coatings may be applied by any of a wide variety of techniques used to coat paper and articles, including blade coaters, air knife coaters, roll coaters, short dwell coaters, and spray coating apparatus. Examples of several such apparatus are discussed below in the section entitled "Coating Techniques and Apparatus". Standard apparatus and techniques of using such apparatus, as known in the art, will be generally suitable for the subsequent polyester coating of the hydroxy-phenoxyether polymer coated or impregnated fiber-based substrates. For molded fiber articles, spray coating is preferred. Methods described below in reference to hydroxy-phenoxyether polymers may be readily adapted to polyester materials of the type disclosed herein.

Conditions are controlled and varied throughout the process to give the desired product. Thus, the weight and consistency of the coating on the paperboard is controlled by controlling one or more of various factors including, but not limited to, the temperature of the various stages of the process, the machine speed, and the application equipment such as an air knife.

Figure 2:
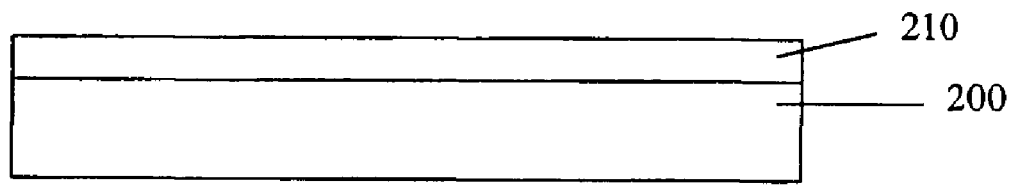
FIG. 2 is a cross-section of a coated substrate according to a second preferred embodiment.

One preferred embodiment of coated paper or paperboard is that shown in cross-section in FIG. 1. The material shown in FIG. 1 has a paper or paperboard substrate 100 which may or may not be impregnated with hydroxy-phenoxyether polymer. On at least one surface of the substrate, there is a hydroxy-phenoxyether polymer coating 110. On the hydroxy-phenoxyether polymer coating is a coating of polyester resin 120. In one embodiment, the polyester resin coating is preferably at least 1 mil thick. A second embodiment of coated paper or paperboard is that shown in FIG. 2. The material of FIG. 2 is similar to that of FIG. 1 except that the hydroxy-phenoxyether polymer coating layer 110 has been omitted. In this embodiment, the substrate 200 is impregnated with hydroxy-phenoxyether polymer and is coated with polyester resin 210. In alternate embodiments, the polyester coating may be on more than one or even all surfaces of the substrate.

Furthermore, the coating weight is dependent, in part, upon the percent solids in the coating solution. While the percentage solids employed will vary with line speed and application pressure, typically a polymer dispersion of about 20%-40% solids is preferred, with 27%-32% solids being more preferred. In some methods of application, higher solids content may be used including 45%, 50%, 55% or higher, and in others a lower solids content may be used such as when a lower viscosity is needed or desired for coating method which is used, including 15%, 10%, 5% and the like.

The paperboard product, once formed, can be collected on a roll in a continuous process and passed on for further processing. This further processing may include formation of the paperboard product into a package or blank or any other form, typically involving cutting, scoring, slitting, etc. Alternatively, the completed paperboard product can be passed to a corrugator for incorporation into corrugated board. A corrugator typically unwinds two or more continuous paper from rolls, presses flutes into the sheet of corrugating medium, applies adhesive to the tips of the flutes and bonds the sheet of paperboard to form corrugated board.

In the finished coated product, adherence of the coating to the paperboard is such that they are essentially inseparable, that is, peeling is practically impossible. The fibers of the paperboard will separate before the coating will peel from the paperboard.

Preferred Hydroxy-Phenoxyether Polymer-Containing Papers

As noted above, preferred embodiments include paper, including paperboard and molded fiber, comprising hydroxy-phenoxyether polymers. The discussion which follows provides details on such hydroxy-phenoxyether polymer-containing paper.

The amount of hydroxy-phenoxyether polymer in the paper of the preferred embodiments is generally selected to be effective to provide the paper with a desirable property such as increased sizing and/or strength. Preferred amounts of hydroxy-phenoxyether polymer in the paper may be in the range of from about 0.01% to about 50%, more preferably about 0.1% to about 25%, even more preferably about 0.5% to about 20%, most preferably about 1% to about 10%, by weight based on total paper weight, depending on the particular application and the degree of sizing, strength or other property desired.

The hydroxy-phenoxyether polymer used in the methods and materials described herein may comprise virgin material, recycled or post-consumer material, or some combination of the two. It has been found that use of recycled hydroxy-phenoxyether polymer in the materials, products, and methods described below results in a minor reduction of the advantageous properties which result from inclusion of the hydroxy-phenoxyether polymer, if any reduction occurs at all. As such, it is intended that hydroxy-phenoxyether polymer comprising some or all recycled polymer optionally be used in any of the methods described herein, whether or not there is specific mention of the option of its use in any given example or description.

The term "sizing," as used herein, is a broad term and is used in its ordinary sense to include, without limitation, resistance to penetration by a liquid. The liquid in question may be aqueous or organic in nature. For a particular liquid, sizing may be assessed qualitatively by observing the extent and rate at which a drop of liquid spreads through the paper after being placed on the surface of the paper, by e.g., measuring the rate of spreading as a function of time. Various types of water, grease and aqueous liquids may be used to assess sizing, depending on the intended application for the paper. For instance, in a packaging application involving a greasy or oily food, the use of the grease or oil in question may be appropriate, whereas orange juice, milk or water may be more appropriate test fluids in situations where resistance to those liquids is desirable. In other situations a more quantitative measure, such as a measurement of Cobb sizing, is appropriate. The Cobb test evaluates sizing in terms of the amount of liquid absorbed by the paper over a defined interval of time and is typically reported as the weight of liquid absorbed in units of grams of liquid per square meter of paper. It is a well-defined method known to those skilled in the art, see e.g. TAPPI T 441 om-90 (1990). The lower the Cobb value, the better the sizing, and a decrease in Cobb value represents an increase in sizing.

Quantitative sizing tests also exist for oil and grease resistance. For oil, these include the 3M Kit Test, which is identical to TAPPI Useful Method 557. It consists of testing the paper with droplets of increasingly aggressive mixtures of castor oil, toluene, and heptane to determine resistance to staining. Higher Kit numbers indicate better oil and grease resistance. For grease, these include TAPPI Test Method T 454 om-89 (turpentine test for grease resistance of paper). This test consists of exposing the sheet surface to sand saturated with colored turpentine for various periods of time. Longer periods of exposure without staining indicates better grease resistance. Preferred papers contain hydroxy-phenoxyether polymer in an amount that is effective to provide the paper with improved resistance to water, oil and/or grease, as compared to a comparable paper.

When assessing water resistance, a preferred paper has an increase in sizing that is manifested as a decrease in Cobb value of about 5% or more, as compared to a comparable paper. When assessing oil resistance, a preferred paper has in increase in sizing that is manifested as an increase in the Kit value of about one or more, as compared to a comparable paper. When assessing grease resistance, a preferred paper has in increase in sizing that is manifested as an increase in the turpentine test value of about 5% or more, as compared to a comparable paper. As used herein, a "comparable paper" does not contain a hydroxy-phenoxyether polymer, but is in all other meaningful respects substantially identical to the paper containing the hydroxy-phenoxyether polymer that is the subject of the test. For instance, if a comparable paper has a Cobb value of 100 g/m2, then a paper having an increase in sizing that is manifested as a decrease in Cobb value of about 5% or more has a Cobb value that is (100−(100×0.05))=95 g/m2 or less. Preferably, the paper has a Cobb value of 100 g/m2 or less, more preferably 40 g/m2 or less.

Other tests may be used to assess sizing. For instance, those skilled in the art are aware of the well known Hercules Sizing Test (HST), which is TAPPI Test Method T530 pm-89 Size test for paper by ink resistance (Hercules method), and will select the test that is most appropriate in accordance with principles understood by those of skill in the art.

Hydroxy-phenoxyether polymer may be incorporated into paper by the various methods described herein to provide that paper with an increase in strength. The term "strength," as used herein, is a broad term and is used in its ordinary sense to mean, without limitation, resistance to rupture or deformation under an applied load. It may include one or more of the following and may be measured dry or wet: tensile strength, compressive strength, tear resistance, burst strength, stiffness (flexural modulus, also referred to herein as flexural strength), tensile energy absorption, (TEA), surface strength, abrasion resistance, folding resistance, and ply bond strength. Preferably, the paper has an increased dry tensile strength and/or an increased wet tensile strength of about 5% or more, more preferably 10% or more. Preferably, the paper has an increased flexural strength (or modulus) and/or an increased wet flexural strength (or modulus) of about 5% or more, more preferably 10% or more. In a particularly preferred embodiment, corrugated paper has an increased wet flexural strength of about 5% or more, more preferably 10% or more. This increase in the wet flexural strength of corrugated paper may be accomplished by incorporating hydroxy-phenoxyether polymer into the linerboard and/or fluting paper from which the corrugated paper is made. The magnitude of an increase in strength may be determined by comparison to a comparable paper as defined above, using test methods well known to those skilled in the art.

Hydroxy-phenoxyether polymer may also be used to improve the productivity of the papermaking process. Preferably, the hydroxy-phenoxyether polymer is incorporated into a wet paper web in an amount effective to increase wet web strength. Most preferably, this increase in wet web strength results in decreased line breaks on the wet end of the machine, leading to increased paper mill productivity.

For foods such as baked goods, it is often preferable for the packaging to have a certain degree of "breathability" or permeability in order to allow the moisture content to change in an amount that is effective to preserve freshness and crispness. However, staleness of the baked goods may result if the packaging is overly permeable. The inventors have found that the permeability of the paper or paperboard may be adjusted by controlling the amount of hydroxy-phenoxyether polymer incorporated therein. Relative to comparable paper as defined above, the paper preferably exhibits lower permeability to gases such as oxygen, nitrogen, carbon dioxide, and/or water vapor. Most preferably, the amount of hydroxy-phenoxyether polymer in the paper is effective to allow the desired degree of gas permeability, depending on the particular application. For instance, for some food packaging and non-food application such as ream and roll wrap, relatively high levels of resistance to moisture (water vapor) and oxygen transmission are frequently preferred, and may be obtained by incorporating hydroxy-phenoxyether polymer. Water vapor permeability may be measured by TAPPI Test Method T 523 om-93 Dynamic measurement of water vapor transfer through sheet materials. Results are typically reported in units of grams per square meter per day (gsm/day). Preferred values tend to depend on the application, e.g., about 15 gsm or less for bakery boxes, about 10 gsm or less for ream paper, and about 5 gsm or less for detergent boxes. Permeability of oxygen may be measured by a Mocon instrument in units of cubic centimeters per square meter per day (cm3/m2/day). Preferred values tend to depend on the application, e.g., about 250 cm3/m2/day or less for keep fresh boxes, about 200 cm3/m2/day or less for bag paper, and about 100 cm3 μm2/day or less for barrier paper.

The paper described herein may be shaped, processed or incorporated into semi-finished or finished manufactured items such as writing paper, drawing paper, paper towels, tissues, containers (e.g., paper bags, paper boxes, cardboard boxes, mailing tubes, file folders), photo paper, glossy paper, cardboard, corrugated cardboard, disposable diapers, adhesive labels, honeycomb structures (e.g., cellular structures having open or closed cells of one or more shapes, including without limitation hexagonal, polygonal, and/or rounded shapes), sandpaper, and packaging material, by processes and methods generally known to those skilled in the art.

In a preferred mbodiment, a process for making paper is provided. A preferred process involves making paper by using an amount of a hydroxy-phenoxyether polymer that is effective to provide the paper with an increase in sizing or strength. The hydroxy-phenoxyether polymer may be incorporated into the paper at any convenient point or points during the process of making the paper or by treating or coating the formed paper.

Figure 3:
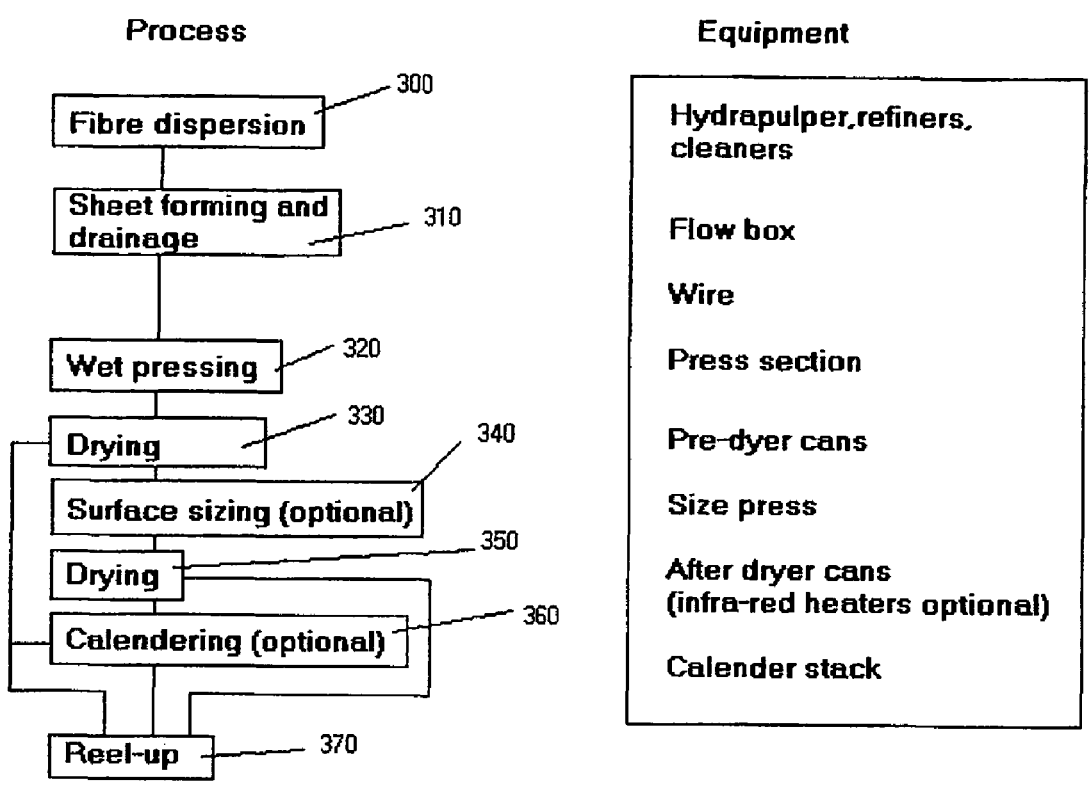
FIG. 3 shows a non-limiting example of a flow diagram that illustrates various aspects of a typical papermaking process.

An illustrative, non-limiting example of a flow diagram for a typical papermaking process in shown FIG. 3. FIG. 3 also identifies typical equipment used at the various states of the process. In such a process, bales of dry wood pulp or waste paper may be pulped in a hydrapulper to form a pulp slurry (fibre dispersion 300) with a consistency in the range of about 2 to about 30% depending on the pulper and the manufacturing process. The pulp may then be refined to enhance the strength and bonding properties of the cellulosic material. Refining may be carried out at a range of consistencies depending on the refiners used and therefore may involve dilution of the pulp slurry. After refining, the pulp slurry is usually screened and cleaned to remove impurities, then passed to blending tanks where chemical additions are made. This is one point where the hydroxy-phenoxyether polymer may be intermixed with the pulp slurry.

Typically, the next stage of papermaking is the sheet forming and draining process 310. The sheet forming process suitably consists of seven distinct sections: Headbox (or flowbox), wire section, press section, dryer section, size press, calendar and reel up. The headbox is a collecting box for dilute pulp slurry. A narrow aperture running across the width of the box allows the pulp slurry to flow onto the wire with the cellulosic material being distributed evenly over the width of the paper machine. The wire is often a woven plastic mesh conveyer belt and as the pulp slurry flows from the flow box onto the wire the water drains away initially by gravity and then aided by suction to leave a paper web on the wire. This is one point where the hydroxy-phenoxyether polymer solution or dispersion could be intermixed with the paper web, e.g., by spraying onto the web. The amount of the polymer entrained in the web usually depends on the temperature and moisture content of the web, the solids content and viscosity of the polymer solution or dispersion, the speed of the machine and the pressure of the rolls at the press section.

In the press section 320, the paper web, typically supported on a felt, passes through a series of rollers, which tend to consolidate the web and remove more water. The web then passes to the dryer section 330, which consists of a large number of heated 'cans' or cylinders to evaporate the remaining water. Surface sizing 340 can be conducted with a size press, which may be located part way down the drying section, is another point where the hydroxy-phenoxyether polymer solution or dispersion may be intermixed with the wet paper or paper web. After the drying section 350, on many machines there is a calender stack 360. Here a series of polished rollers consolidate and polish or glaze the surface of the paper giving a smoother finish. Calendar sizing may also be used to size the paper with the hydroxy-phenoxyether polymer. Finally, the finished paper is reeled up 370 for transport to further processing or for slitting down into smaller reels or individual sheets.

The papermaking process also offers the potential for the application of the hydroxy-phenoxyether polymer to single ply or multi-ply paper. Multi-ply paper may be produced with the polymer laminated between the plies or, as in the case of single plies, with the polymer contained throughout the whole paper sheet. Multi-ply paper and board offers good product versatility especially with the application of hydroxy-phenoxyether polymer. Paper/board can be produced with the plies made from the same pulp slurry and with the same basis weight, or the plies can be from different pulp slurries and/or have different basis weights. Multi-ply sheets are generally made in a similar manner to single ply sheets, but each ply tends to have its own headbox and wire section with the two or more plies meeting in the press section for consolidation and bonding. Intermixing hydroxy-phenoxyether polymer may enhance this bonding, e.g., providing increased ply bond strength, and may increase the strength and resilience properties of the paper or paperboard.

The term "molding," as used herein, is a broad term and is used in its usual sense to include, without limitation, various processes for shaping paper or concentrated pulp slurries to form desired shapes such as sheets or three-dimensional objects. The products resulting from these processes may be referred to herein as being "molded" products. For instance, pulp molding may be used to make the paper of the preferred embodiments. As an example of pulp molding, also known as dip molding, a wire mold is formed into the shape of the object in question, e.g., an egg carton. The mold unit is attached to a vacuum source with an intermediate separator or trap, such that when the mold is dipped into a pulp slurry, water is drawn through the wire and deposits a paper web on the surface of the wire in the shape of the object. When sufficient thickness of cellulosic material is built up on or in the mold, the mold is withdrawn from the pulp slurry and air may then be drawn through the wet web to partially dry it. The formed shape is then transferred to a support and dried by e.g., passage through an oven, infrared drying unit or similar drying system to produce the final article. In some instances, e.g., the production of smooth, glazed containers, the wet article may be inserted into a polished die and expanded against the heated walls of the die by an inflatable rubber bladder. The bladder may then be deflated and the shape removed from the die for final drying.

The hydroxy-phenoxyether polymer may be added to the pulp slurry before molding, in the same manner as it may be added to the pulp slurry before forming on a paper machine. Alternatively, it may be added by impregnation of the dried article by dipping the article into a polymer solution or dispersion with or without the application of pressure or vacuum to the article to force the polymer into the interior of the cellulosic mass. The article may then be dried in the usual manner to give a product with superior properties, e.g. improved water and oil resistance, improved toughness, and improved compressive and tensile strength.

In preferred embodiments, the hydroxy-phenoxyether polymer is incorporated into the paper by intermixing with: the pulp slurry, the paper web or wet paper sheet on the paper or paperboard machine, formed paper plies to form multi-ply paperboard or paper laminate, the paper or paper web by surface addition at the size press, paper or board by on-machine surface coating or off-line in another process, etc. The term "intermixing," as used herein, is a broad term that that is used in its ordinary sense to include, without limitation, all manner of applying, mixing, coating and/or spraying the hydroxy-phenoxyether polymer (or mixture containing the polymer) with or onto cellulosic material to form an admixture that comprises the polymer and the cellulosic material. Thus, the resulting admixture may but need not be a heterogeneous or homogeneous physical mixture of cellulosic material and hydroxy-phenoxyether polymer. The admixture may be in the nature of a layer or coating of hydroxy-phenoxyether polymer on the cellulosic material. The term "cellulosic material," as used herein, is a broad term that is used in its ordinary sense to include, without limitation, all manner of cellulose-containing compositions, including pulp slurry, the paper web that is formed during the papermaking process, the concentrated pulp slurry used in the pulp molding process, wet paper, and dry paper.

In a preferred embodiment, paper is made by a process comprising providing a pulp slurry or paper web, providing a solution or dispersion comprised of a hydroxy-phenoxyether polymer, intermixing the solution or dispersion with the pulp slurry or paper web to form an admixture, and forming paper from the admixture, wherein the hydroxy-phenoxyether polymer is used in an amount that is effective to provide the paper with an increase in sizing or strength. For sizing, preferred amounts of polymer may be in the range of from about 0.01% to about 10%, more preferably about 0.1% to about 5%, by weight based on total weight of paper. For strength, preferred amounts of polymer may be in the range of from about 0.1% to about 50%, more preferably 1% to about 30%, by weight based on total weight of paper. In more preferred embodiments, the hydroxy-phenoxyether polymer is intermixed with the cellulosic material by forming a solution or dispersion comprised of the polymer, and adding it to the pulp slurry, paper web, or formed paper by preferred techniques such as by mechanical mixing with the aqueous pulp slurry (with or without pH adjustment) and/or spraying or coating the paper web or formed paper.

The hydroxy-phenoxyether polymer may also be applied in a foam coating process. For example, a foam comprised of hydroxy-phenoxyether polymer may be 'sandwiched' between two or more paper layers to produce a laminated structure. Impregnation of a pre-dried sheet makes more efficient use of the natural bonding properties of the cellulosic material and permits some control of the distribution of polymer through the thickness of the sheet. This may be done either at the size-press or as an off-line process.

Preferred hydroxy-phenoxyether polymers are soluble in aqueous acid and such polymer solutions may be intermixed with the cellulosic material. An example of a preferred polymer is polyetheramine. A most preferred polymer is available from Dow Chemical under the tradename BLOX®. A polymer solution may be prepared by stirring or otherwise agitating the hydroxy-phenoxyether polymer in a solution of water with acid, preferably acetic or phosphoric acid. The resulting polymer solution may be intermixed with cellulosic material to form an admixture. The admixture may then be processed in the usual manner to eventually remove the excess water and form the paper. In a preferred embodiment, the acid concentration in the polymer solution is preferably in the range of about 5%-20%, more preferably about 5%-10%, by weight based on total weight. In other preferred embodiments, the acid concentration may be below about 5% or above about 20%, depending on the type of polymer and its molecular weight. The amount of dissolved polymer in a preferred embodiment is about 0.1% to about 40%. A uniform and free-flowing polymer solution is preferred for application at the wet end. Most preferably, a 10% polymer solution is prepared by dissolving the polymer in a 10% acetic acid solution at 90° C. and while still hot the solution diluted with 20% distilled water to give an 8% polymer solution. At higher concentrations of polymer, the polymer solution tends to be more viscous.

A polymer solution may be optionally neutralized by the addition of a base before or after intermixing with cellulosic material to precipitate the polymer, forming a polymer dispersion. A polymer dispersion may also be formed by intermixing small particles of polymer with a liquid, preferably an aqueous liquid and preferably by high shear mixing techniques known to those skilled in the art. Depending upon the specifics of the method used to form the paper, it may be desirable for the polymer solution or dispersion to have certain qualities such as a particular degree of dissolution/precipitation, larger or smaller precipitate particle size, or a pH in a certain range. These properties can, in part, be controlled by the degree of neutralization, the manner in which neutralization is carried out, and the place in the process in which neutralization is carried out.

Neutralization is preferably performed by the addition of a strong base (alkaline) material such as caustic soda (sodium hydroxide), or potassium hydroxide to the medium containing the polymer. The degree of neutralization may be used to control the degree of precipitation of the polymer from the solution, with the amount of precipitation increasing as more alkali is used. If sufficient alkali is added, the solution eventually becomes a dispersion of polymer particles in the solution. The solution or admixture need not be fully neutralized prior to processing; it can be partially neutralized. A higher degree of precipitation may be desirable in some embodiments, as there may be a greater degree of adhesion between polymer and the cellulosic materials when the polymer molecules have aggregated to the point of no longer being dissolved. Thus, in preferred embodiments, the process of making paper comprises adjusting the pH of the admixture to precipitate a least a portion of the hydroxy-phenoxyether polymer, most preferably in the presence of the cellulosic material prior to forming a web. Most preferably, the process comprises adjusting the pH of the admixture to be in the range of about 4 to about 7.

The manner in which neutralization is carried out may also affect the result. If the alkali used for neutralization is added slowly, the dispersion which forms tends to be fairly uniform and of a moderate to small particle size. On the other hand, if all of the alkali is added quickly, the dispersion which forms tends to have a greater variety of particle sizes as well as having many more larger size particles as compared to the slowly neutralized material. Therefore, the speed of alkali addition may be used to promote a particular particle size or particle size distribution. Preferably, the dispersion has a number average particle size of about 500 microns or less, more preferably 100 microns or less, most preferably 10 microns or less.

Precipitation/neutralization may take place prior to intermixing the polymer solution/dispersion with the cellulosic material, or it may be don while the polymer is in contact with the cellulosic material. Also, it may be desired to perform the neutralization at a particular point in the process for reasons including, but not limited to, the minimization or maximization of the length of time that a particular process takes, the optimization of the viscosity of the medium at one or more places in the process, or to prevent certain equipment from becoming exposed to material that falls above or below a particular pH. Materials having a high or low pH may etch, dissolve, or otherwise harm or degrade certain equipment or materials used in the papermaking process. Dispersions tend not to be as free-flowing as polymer solutions, and this difference may be more notable if the cellulosic material is already in contact with the polymer.

Preferably, the polymer is added at either the pulp slurry preparation stage or at the web forming stage. At the pulp slurry preparation stage, the polymer and base (preferably potassium or sodium hydroxide) may be added together, whereas at the wet sheet forming stage, the polymer is preferably added after the base. The most preferred point of polymer addition depends on the viscosity of the polymer solution, its retention and bonding potential at different pulp consistencies (the consistency at the pulp slurry preparation stage tends to be higher than at the web forming stage) and the paper machine's operating procedure.

Maximum retention of the polymer on the cellulosic material is usually preferred to minimize loss of polymer. Retention is preferably maximized at the isoelectric point and decreases as the pH is lowered. Although retention may be poorer at low pH values, both wet and dry strength tend to be high. As pH is increased strength tends to decrease owing to aggregate formation and then tends to increase again as polymer retention increases. Preferably, the polymer particles and the cellulosic material are oppositely charged in order to achieve good retention. A cationic or amphoteric adjuvant may be added to assist precipitation of the polymer onto the surface of the cellulosic material and by adjusting the pH to the electrokinetic point at which the polymer is preferably deposited. Examples of such adjuvants include alum, sodium aluminates, zirconium salts, polyamines, poly(diallyldimethylammonium chloride) (polyDADMAC), poly(ethyleneimine) (PEI), diamine- and dicyanoamide polymers, polyacrylamide copolymers, cationic starches, polyamide-epichlorohydrin resins, and aminoplast resins.

The paper may be formed by intermixing a solution or dispersion of polymer with a paper web or formed paper. Various methods are known in the art. For example, a polymer solution or dispersion may be sprayed onto one or more sides of the web or paper. Other methods include: applying a coating of dispersion or solution on one or more sides using a blade coater; coating or impregnating by placing the dispersion or solution onto one or more sides of the paper or web and allowing gravity, pressure, or vacuum to draw the paper to the polymer; and use of size pressing technology, such as is known in the art, to coat a paper or web with a dispersion or solution of polymer. As discussed above, the application of the solution or dispersion may be done with or without neutralization, and if neutralization is employed, as is presently preferred, it may be partial or complete and may take place at any step in the process.

Beater or wet end addition methods are preferably employed that involve adding the polymer solution to the pulp slurry, preferably resulting in pH of about 4 to about 5, then adding an alkali, preferably NaOH, to bring the pH above 6 to precipitate the polymer onto the cellulosic material. The polymer, preferably polymer solution, may also be added to the dilute loop, preferably at the basis weight valve, along with alkali in the tray water, preferably NaOH, to control headbox pH to be in the range of about 6.0 to about 6.5.

In the wet-web saturation process, which may be used for addition of polymer to web in relatively high concentration (e.g., 35-50% of total weight), the process preferably involves three strategies: water removal by wet pressing; polymer saturation of the wet web by capillary and hydrostatic forces; and redistribution and removal of excess polymer.

Factors influencing the web consolidation and the percentage of polymer in web include the capacity of the web to absorb polymer, the rate of penetration of the polymer into the web, and wet pressing of the web to a level of dryness (preferably <50%) before saturation with the polymer.

Additional components may also be added to the hydroxy-phenoxyether polymer solution or dispersion to enhance the packaging properties and/or appearance of the paper. Two categories of additives are preferred, process aids and product additives. Examples of process aids are as rheology modifiers or thickeners, calender lubricants, and biocides. Examples of product additives are optical brightening agents, crosslinking agents, plasticizers, dyes, fillers, anti-static agents, anti-slip or anti-tack agents and flame retardants. Other materials e.g., plastics, metals, wood, ceramic, minerals, glass, carbon, etc., in various forms, e.g., long fiber, short fiber, woven fiber, powder, etc., may be added to the polymer, and may add to or take the place of cellulosic materials. Process additives may be used to improve the efficiency of the coating operations, e.g., by controlling coatweight and uniformity or by preventing microbial attack. Product additives may be used to improve the performance of the product. For example, crosslinking agents tend to increase the rigidity and water-resistance of the product. They include materials such as aminoplast, epihalohydrin or glyoxal resins and inorganics such as zirconium compounds. Plasticizers may include low Tg (glass transition temperature) acrylic or vinyl resins to improve flexural properties.

The order and manner of addition of the ingredients is preferably controlled to avoid gross precipitation of the hydroxy-phenoxyether polymer from solution or sudden increases in viscosity. A high-shear mixer is preferably used, but caution should preferably be exercised to avoid shearing the polymer to the extent that the viscosity and effectiveness of the coating are reduced. The additives should also be compatible with the acidic nature of the dispersion or solution.

Figure 4:
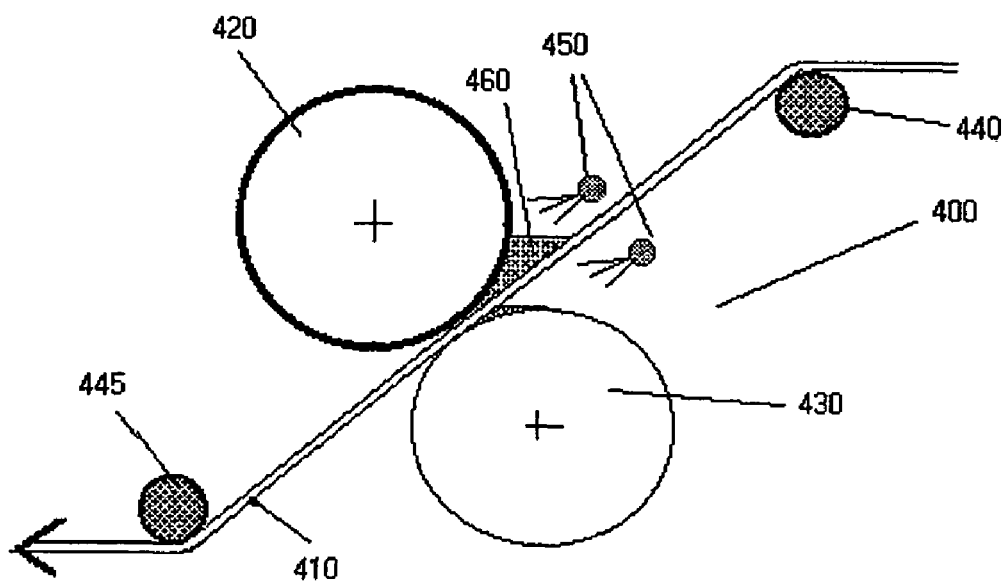
FIG. 4 shows a non-limiting schematic diagram that illustrates various aspects of a "puddle" size press.

Both standard 'puddle' size presses and metering size presses may be used for intermixing. Puddle size press are preferably used on slower paper machines and tend to give strength improvements together with oil and grease resistance. A non-limiting schematic diagram illustrating various aspects of a typical "puddle" size press 400 is shown in FIG. 4. In such a puddle size press, a paper web 410 is fed between a rubber covered roll 420 and a hard roll 430, by way of turn rolls 440 and 445, and a sizing composition is supplied by sprays 450, forming a puddle 460 between paper web 410 and rubber covered roll 420.

Figure 5:
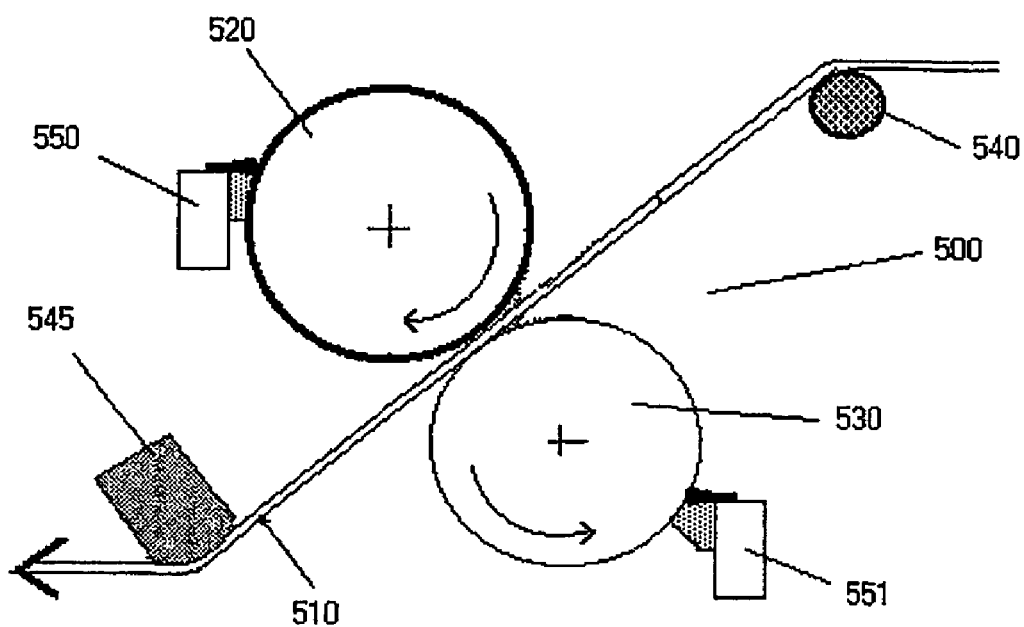
FIG. 5 shows a non-limiting schematic diagram that illustrates various aspects of a metering size press.

Metering size presses tend to give less penetration, therefore less strength improvement but higher film forming and barrier performance. They are often used on larger, higher speed machines. A non-limiting schematic diagram illustrating various aspects of a typical metering size press 500 is shown in FIG. 5. In such a metering size press, a paper web 510 is fed between a roll 520 and a roll 530, by way of a turn roll 540 and an air turn 545, and a sizing composition is applied to the hard roll 530 by coating head 550, and also to rubber covered roll 520 by coating head 551, which roll 530 and roll 520 in rotating supply the sizing to the paper web 510. Roll 520 and roll 530 are preferably coated with an elastomer, with the elastomer on roll 520 being preferably softer than the elastomer on roll 530. Size press treatment may be used to provide a single functional coat or a ground-coat for further coating applications later as in the production of base stock for silicone release papers. Platy clays or similar minerals may be incorporated in the polymer formulation to improve cost-effectiveness of the coating.

Paper strength is often influenced by the bonding between the cellulosic material and the polymer. Factors which influence the adhesion or adhesive bonding between the cellulosic material and polymer include: wetting of the surfaces; solidification (to provide resistance to shear); deformability (to reduce stress concentration); intimate contact between surfaces (such as is preferred for chemical bonding); diffusion of macromolecules of bonding materials within the adhesive zone; temperature (adhesion increases near Tg, and lowering Tg's by e.g., adding water, may increase adhesion within the composite). Adhesion may also be influenced by the capability of the polymer molecules to penetrate into the cracks and pores of the cellulosic material. The effective diameter of the polymer may also affect its penetration ability.

Adhesion or bonding may be improved by improving the surface reactivity of the cellulosic material. Preferably, this may be done by chemical or electrochemical means. For example, one may increase the ionic character of the cellulosic material. Ionic bonding with the cellulosic material may be helpful because ionic bonds are rapidly formed in aqueous systems and need no further curing, and compounds capable of forming ionic bonds are often soluble in water, the preferred solvent for the solutions and dispersions herein. Furthermore, ionic bonds are usually reversible, and these electrostatic attractions can take place over a greater distance than covalent bonds. Reactive products known in the art may be used to create anionic sites on the cellulosic material. Cationic polyacrylamide, polyethylene amine, cationic starch, cationic guar (galactomannan) gum, and chitosan (from sea shells) are examples of preferred products used to enhance paper strength, and may function by increasing bonding.

Additionally, other methods may be used such as treatment with wetting agents, surfactants, and acids or bases. Polymers having good wetting capability towards the cellulosic material can, during the drying process, enhance strength as the polymer comes into closer contact with the cellulosic material. Other factors that may influence bonding are the particle size, viscosity, stabilizer level, and presence of functional groups like carboxyl groups within the polymer or on the surface of the cellulosic material. Surfactants may improve bonding by helping to reduce surface tension or increase the hydrophobicity of the cellulosic material. This in turn allows the building of a bulkier web at a given level of water. POLY-WET™ surfactants, available commercially from Peach State Labs, Inc., Rome, Ga., USA, may be used to improve stability and adhesion.

When the processes described herein are used on formed paper, a coated paper may result. Thus, a process for coating paper is also provided, comprising providing a paper, providing a solution or dispersion comprised of a hydroxy-phenoxyether polymer, applying the solution or dispersion to at least a portion of the paper to form a wet paper, and drying the wet paper to form a coated paper. The solution or dispersion may be applied using any convenient technique described herein for intermixing a polymer with a paper web or formed paper. Drying may be accomplished by simple evaporative techniques, or may be encouraged by known methods such as by heating the wet paper. Preferably, for processes described herein that involve drying, the drying temperature is near the melting or glass transition temperature of the hydroxy-phenoxyether polymer. In preferred embodiments, the coated paper has a Cobb value of about 100 g/m2 or less, preferably about 50 g/m2 or less. Preferably, the coated paper is comprised of from about 0.1% to about 50%, more preferably about 1% to about 30%, even more preferably about 2% to about 20%, most preferably about 5% to about 15%, by weight based on total coated paper weight, of the hydroxy-phenoxyether polymer.

Coating Techniques and Apparatus

Figure 6:
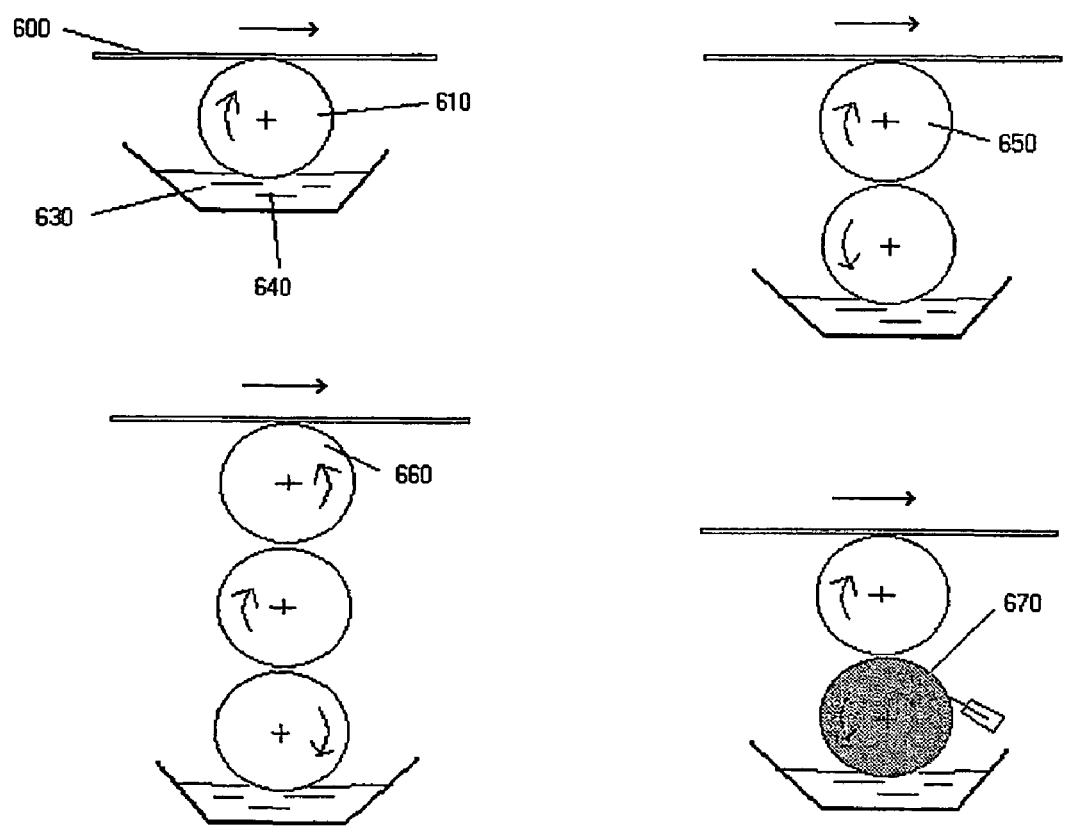
FIG. 6 shows non-limiting schematic diagrams that illustrate various types of roll coaters.

Paper may be coated using a variety of known methods, including: roll, reverse roll, gravure, dip saturation, fountain, blade, rod, and air knife. A non-limiting schematic illustrating various types of roll coaters is shown in FIG. 6. The simplest form of roll coater has a paper 600 contacting a roll 610 dipping into the polymer dispersion or solution 630 contained in a pan 640. This type of system is very sensitive to changes of speed and the level of the liquid in the pan. The addition of a transfer roll 650 tends to smooth out the liquid film on the lower roll and presents a more uniform coating to the paper. Changing the gap between the rollers controls the thickness of the liquid film transferred to the sheet. The liquid film may be sheared down further by using a reverse-roll applicator 660 in which the direction of rotation of the transfer roll is opposed to the direction of travel of the paper or board substrate. In a preferred embodiment, coat weights are between about 5 and 20 g/m2 per side.

For gravure coating the engraved cells on the surface of the gravure roll 670 pick up the solution or dispersion, with the excess being doctored off by a blade. This enables the gravure roll to apply a precise coating thickness regardless of variations in the substrate thickness typically laying down coat weights of between 0.5 and 8 g/m2. The coating solution or dispersion is preferably of a fairly low viscosity.

Figure 7:
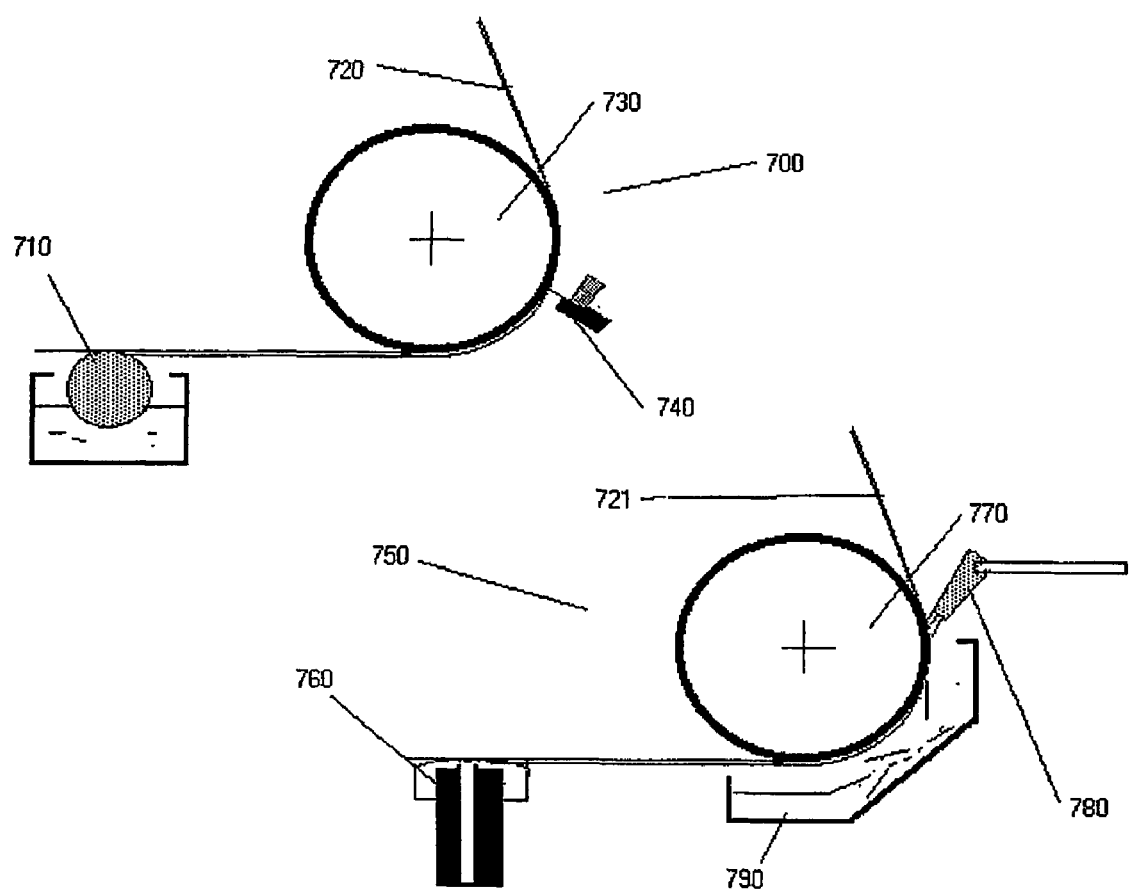
FIG. 7 shows non-limiting schematic diagrams that illustrate various aspects of blade and air knife coaters.

The paper is typically supported by a backing roll at the point of contact with the transfer roll. The transfer, reverse roll and gravure coaters usually pre-meter the polymer dispersion or solution before application. In the case of blade, air knife and rod coaters, the metering process usually takes place after application. A non-limiting schematic illustrating various aspects of blade coater 700 and air knife coater 750 is shown in FIG. 7.

Air knife, blade and rod coaters may use either a roll coater 710 or a fountain applicator 760 to apply an initial layer of coating to the coated sheet 720 or 721, then employ a separate metering method for control of coatweight. The fountain applicator 760 is a slit or channel through which the dispersion or solution is forced in order to ply upon and be picked up by the passing sheet surface.

In air knife coating the polymer dispersion or solution is applied in excess to the paper substrate 721, then a backing roll 770 is used to carry the paper to an air curtain 780 which is used to remove the excess as well as level the coating on the sheet. The excess can be recovered in a catch tray 790. The amount of coating applied is governed by air pressure, angle of the air jet, machine speed and resin solids. In blade coating, a backing roll 730 is used to carry the paper 720 to a flexible steel blade 740 which acts as the metering device. The coatweight then depends on blade angle and pressure, solution or dispersion solids, machine speed as well as substrate roughness compressibility and permeability.

Figure 8:
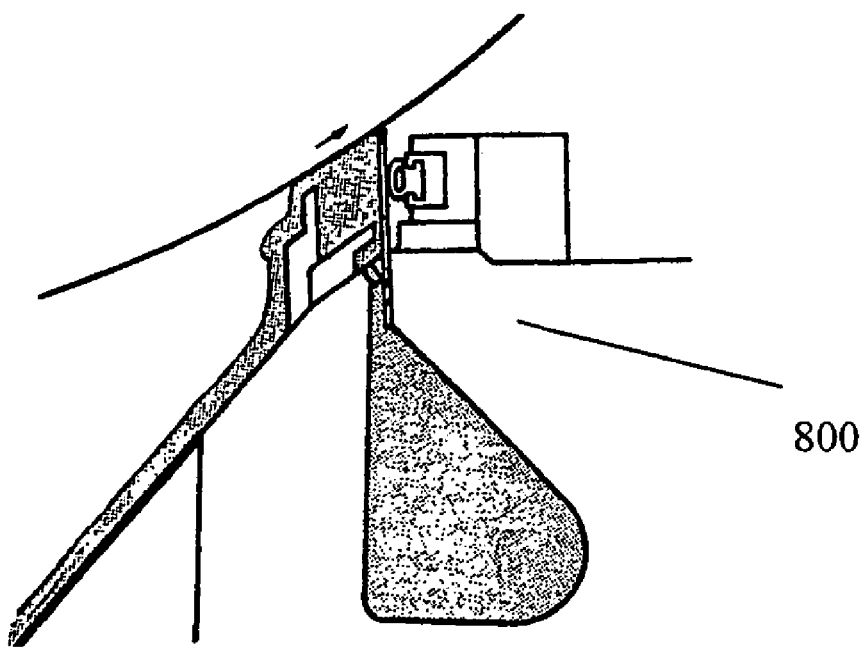
FIG. 8 shows a non-limiting schematic diagram that illustrates various aspects of a simple short dwell coater.

In rod coating, the excess solution or dispersion is removed by either a smooth or a wire wound rotating rod (Mayer bar). The amount of coating applied is governed by wrap around the applicator roll, wire diameter around the rod, web tension and coating solution or dispersion viscosity and solids. A further method of application is cast-coating in which a layer of polymer is coated onto a smooth, heated cylinder then transferred in a semi-dry state to the surface of the paper. Such methods are commonly used when a very smooth, glossy surface is applied but operate at slower speeds than blade coating. Additives such as casein may be used to obtain desired bulking and release properties in the cast coating. Short-dwell coaters combine the application and metering stages in one unit. A non-limiting schematic illustrating various aspects of a simple short dwell coater 800 is shown in FIG. 8. Short dwell coaters are well known to those skilled in the art, see e.g., U.S. Pat. No. 4,250,211, which is hereby incorporated by reference in its entirety.

Other methods of applying the polymer solution or dispersion to the paper include spraying through fine nozzles on a spray beam or using an air-jet sprayer as in paint application. This method limits solution solids and requires high levels of filtering, but is appropriate for spraying polymer dispersions between the plies of a multiply sheet as in paperboard production. Foam addition is another possibility. A foam generator and applicator system may be used, along with a foam builder such as a protein or surfactant blend. One or more of the above coating methods may be used.

In many cases thickening agents or rheology modifiers are used to improve the coverage and uniformity of the coating. The performance of hydroxy-phenoxyether polymer as a barrier coating may be improved by the addition of platy clays, preferably at a level below the critical pigment volume concentration. After coating, the coated paper may be calendered to improve surface smoothness.

Laminates

Preferred embodiments provide laminates and processes for making them. As used herein, "laminate" is a broad term that is used in its usual sense to encompass layered structures, here formed from a layer of paper, a layer of a solid material such as a second paper or non-paper material, a hydroxy-phenoxyether polymer, and a polyester. The hydroxy-phenoxyether polymer may be a separate layer and/or may be contained within one or more of the paper layers, and preferably serves to bond one or more of the layers to one another. The solid material may be virtually any material including paper, metal, foam, e.g., plastic foam, wood, polymer e.g., thermoplastic polymer, thermoset polymer, filled polymer (e.g., contains fibers or particles of organic or inorganic filler), glass, stone, concrete, and ceramic. A preferred laminate is comprised of hydroxy-phenoxyether polymer, at least one layer comprised of paper, and at least one layer comprised of a second paper or a solid non-paper material and at least one layer of polyester. Preferably, the laminate is comprised of from about 1% to about 50%, more preferably about 2% to about 30%, even more preferably about 3% to about 20%, most preferably about 5% to about 15%, by weight based on total laminate weight, of the hydroxy-phenoxyether polymer.

A preferred laminate displays synergism as compared to the individual components of the laminate. The term "synergism," as used herein, is a broad term and is used in its ordinary sense to include interactions between parts that produce a result that is greater than the sum of the individual effects. For instance, a preferred laminate can display synergism by exhibiting a physical property which is greater than would be expected based on the rule of mixtures, on a weight basis. More preferably, a laminate displays synergistic strength, e.g., has greater strength, most preferably flexural strength, than the sum of the corresponding strengths of each of its individual components, adjusted for the weights of the components in the laminate.

A preferred laminate is further comprised of additional materials or fillers, more preferably a fibrous materials. Preferred fibrous materials include plant fibers made from wood pulp, cotton fibers, hemp, bagasse, abaca, flax, southern pine, southern hardwood fibers, cellulose, wheat, starch, modifed starch, chitin, chitosan, keratin, cellulose acetate, cellulose materials derived from agricultural products, gluten, nut shell flour, wood flour, corn cob flour, guar gum, and mixtures thereof.

A preferred embodiment provides a laminate that is less permeable to gases and water vapor, as compared to a comparable laminate. As used herein, a "comparable laminate" does not contain a hydroxy-phenoxyether polymer, but is in all other meaningful respects substantially identical to the laminate that is the subject of the test. For instance, a preferred laminate having a thickness of one millimeter (mm) and comprised of a 0.4 mm first paper layer, a 0.4 mm second paper layer and a 0.2 mm hydroxy-phenoxyether polymer layer is less permeable to gases and water vapor than a comparable laminate comprised of a 0.5 mm first paper layer and a 0.5 mm second paper layer but without the hydroxy-phenoxyether polymer. The inventors have found that the permeability of a laminate may be adjusted by controlling the amount of hydroxy-phenoxyether polymer incorporated therein. Relative to a comparable laminate as defined above, the laminate preferably exhibits lower permeability to gases such as oxygen, nitrogen, carbon dioxide, and/or water vapor. Most preferably, the amount of hydroxy-phenoxyether polymer in the laminate is effective to allow the desired degree of gas permeability, depending on the particular application, as discussed elsewhere herein. Water vapor and gas permeability may be determined by methods known to those skilled in the art, as discussed elsewhere herein.

A preferred laminate is comprised of an amount of a hydroxy-phenoxyether polymer that is effective to provide the laminate with an increase in sizing, preferably as manifested by an increase in resistance to water, oil and/or grease as compared to a comparable laminate. For applications where water resistance is desirable, the increase in sizing is preferably manifested as a decrease in Cobb sizing of about 5% or more, as compared to a comparable laminate. For applications where oil resistance is desirable, the increase in sizing is preferably manifested as an increase in the Kit value of about one or more, as compared to a comparable laminate. For applications where grease resistance is desirable, the increase in sizing is preferably manifested as an increase in th turpentine test value of about 5% or more, as compared to a comparable laminate.

Preferably, the process for forming the laminate proceeds by pressing together one or more of the solid materials in such a way as to allow the hydroxy-phenoxyether polymer to at least partially bond the layers together to form a laminate. More preferably, the process comprises bringing paper into contact with a solid material, in the presence of a solution or dispersion comprised of a hydroxy-phenoxyether polymer to form a wet laminate, followed by drying. The paper may be a wet paper or a coated paper as described herein. If the paper is already wet with the solution or dispersion comprised of a hydroxy-phenoxyether polymer, then, further amounts of polymer solution or dispersion may be used but are not required. More preferably, the process comprises forming a wet laminate by bringing the wet paper into contact with a solid material, then drying said wet laminate to form a laminate, optionally with pressure to create a better bond between the layers. Even more preferably, the process comprises forming a wet laminate by bringing a coated paper into contact with a solution or dispersion comprised of a hydroxy-phenoxyether polymer, and optionally into further contact with another paper or non-paper material, then drying the wet laminate to form a laminate, optionally with pressure to create a better bond between the layers. Pressure is preferably applied by running the laminate between rollers. Multiple layers may be formed by repeating the process and/or by bringing together multiple layers simultaneously.

Coating processes as described herein may also be used to apply dispersions of hydroxy-phenoxyether polymer to the surface of paper or board for the purpose of laminating it to another sheet. Sheets of several layers may be built up to provide feedstock for folding cartons, liquid packaging and pouches. The hydroxy-phenoxyether polymer may also be applied between the layers as a foam composition instead of by a coating process. The individual sheets or plies of the laminate may themselves be pre-treated with hydroxy-phenoxyether polymer by any of the methods outlined herein. In this way a multi-ply composite structure may be built up with a relatively high polymer content, suitable for thermo-plastic forming, e.g., for trays and inserts.

Interlayer-addition of hydroxy-phenoxyether polymer by coating or foam application may also be used in the production of spirally wound paper tubes, cores and containers. The hydroxy-phenoxyether polymer may act as both inter-layer adhesive and reinforcing agent to improve strength and rigidity.

Finally, a layer of polyester dispersion is added to the hydroxy-phenoxyether containing laminate, preferably using methods discussed above.

Recyclability

In preferred embodiments, the paper is readily recyclable. In embodiments where the hydroxy-phenoxyether polymer is soluble in aqueous acid, recycling may be facilitated by contacting the paper with aqueous acid to dissolve the polymer, then filtering off the residual cellulosic material. The polymer may then be recovered from the solution by precipitation with base to form a dispersion, followed by separation using known techniques e.g., decantation, filtration, centrifugation, etc., or the dispersion may be used directly in the process for making paper as described elsewhere herein. A preferred process for obtaining recycled hydroxy-phenoxyether polymers comprises providing a paper comprising a hydroxy-phenoxyether polymer, preferably a paper comprised of an amount of the hydroxy-phenoxyether polymer in the range of from about 1% to about 10%, by weight based on total paper weight; contacting the paper with an aqueous solution comprising about 1-50% acid by weight, preferably 10 to 20% acid by weight, preferably acetic acid or phosphoric acid, to at least partially dissolve the hydroxy-phenoxyether polymer to form an acidic hydroxy-phenoxyether polymer solution; separating the acidic hydroxy-phenoxyether polymer solution from any solids present (e.g., wet cellulosic material); adding a base, preferably a hydroxide of an alkali metal or alkaline earth metal, more preferably an aqueous solution of NaOH or KOH, to the acidic hydroxy-phenoxyether polymer solution to form a hydroxy-phenoxyether polymer precipitate; and separating the hydroxy-phenoxyether polymer precipitate, preferably by settling, decantation, pressing, filtration, or centrifugation. The separated polymer thus recovered is a recycled hydroxy-phenoxyether polymer that may be used in any of the processes or materials described herein that call for the use of a hydroxy-phenoxyether polymer.

In preferred embodiments where the hydroxy-phenoxyether polymer is a thermoplastic, the paper may be recycled directly by heating the paper to soften or melt the polymer, then molding or otherwise processing the paper into the desired shape to form a product comprised of recycled paper, in whole or part. Additional polymer, cellulosic material, and/or other additives may be added or removed during recycling and/or processing.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments. Similarly, the various features and steps discussed above, as well as other known equivalents for each such feature or step, can be mixed and matched by one of ordinary skill in this art to perform methods in accordance with principles described herein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein, but instead by reference to claims attached hereto.

What is claimed is:

1. A continuous process for forming a hydroxy-phenoxyether polymer modified paperboard coated with a polyester polymer in an aqueous dispersion, comprising:
   impregnating or coating a paperboard with a solution, dispersion, or extruded coating of a hydroxy-phenoxyether polymer;
   heating the coated or impregnated paperboard for a sufficient time and temperature to reduce the moisture content;
   applying an aqueous dispersion of a water-dispersible polyester resin to at least one surface of the paperboard, and distributing the aqueous dispersion across the paperboard to remove excess dispersion and produce a generally uniform layer of the aqueous dispersion on said surface;
   heating said paperboard to at least partially cure said polyester; and
   cooling the paperboard to at least 160° F. to reduce the tackiness of said at least partially cured polyester.

2. The process of claim 1, wherein the temperatures, times and application of the polyester polymer and its distribution are controlled so as to deposit a film of the polyester on the paperboard that is at least partially cured to permit subsequent repulping of the paperboard and recycling of the paperboard into recycled paper products that can be readily glued and printed.

3. The process of claim 1, wherein said polyester resin is polyethylene terephthalate.

4. The process of claim 1, wherein the hydroxy-phenoxyether polymer comprises a polyhydroxy-amino ether.

5. The process of claim 1, wherein said aqueous dispersion comprises between 20% and 40% solids by weight.

6. The process of claim 1, wherein the second heating step and the cooling step are each conducted so that the polyester polymer is at least partially cross-linked.

7. The process of claim 6, further comprising corrugating the coated paperboard.

8. The process of claim 1, further comprising corrugating the coated paperboard.

9. The process of claim 1, wherein the paperboard is biocompostable.

10. The process of claim 1, wherein the paperboard is repulpable.

11. The process of claim 1, wherein the paperboard is resistant to oil and grease.

12. The process of claim 1, wherein the paperboard is compliant with direct food contact regulations.

13. A process for forming a hydroxy-phenoxyether polymer modified articles coated with a polyester polymer comprising;
    impregnating or coating an article with a solution, dispersion, or extruded coating of a hydroxy-phenoxyether polymer;
    heating the article for a sufficient time and temperature to reduce the moisture content to the desired level;
    applying an aqueous dispersion of a water-dispersible polyester resin to at least one surface of the article; and
    heating said article to a temperature and for a time sufficient to at least partially cure said polyester and dry said aqueous dispersion of the polyester;
    wherein the polyester on the article is at least partially cured to permit subsequent repulping of the article, and recycling of the article into recycled paper products that can be readily glued and printed.

14. The process of claim 13 wherein the article is paper or paperboard or a molded fiber article.

15. A process for forming a coated article, comprising
    applying an aqueous dispersion with a water-dispersible polyester resin to at least one surface of an article, and wherein the article comprises fiber and hydroxy-phenoxyether polymer;
    heating said article to a temperature and for a time sufficient to at least partially cure said polyester and/or dry said aqueous dispersion of said polyester,
    wherein the polyester on the article is at least partially cured to permit subsequent repulping of the article, and recycling of the article into recycled paper products that can be readily glued and printed.

16. The process of claim 15, wherein the applying the aqueous dispersion further comprises distributing the aqueous dispersion across the article to remove any excess dispersion across the article to produce a substantially uniform layer of the aqueous dispersion across the article.

17. The process of claim 15, wherein the applying the aqueous dispersion comprises spraying a dispersion of the polyester onto the article.

18. The process of claim 15, wherein the article comprising fiber and hydroxy-phenoxyether polymer is selected from the group consisting of molded fiber coated with hydroxy-phenoxyether polymer, molded fiber impregnated with hydroxy-phenoxyether polymer, paper coated with hydroxy-phenoxyether polymer, and paper impregnated with hydroxy-phenoxyether polymer.

19. An article comprising:
    a substrate comprising fiber and hydroxy-phenoxyether polymer,
    a layer of at least a partially cured water-dispersible polyester resin on at least one surface of said substrate wherein the article is capable of being recycled and repulped.

20. The article of claim 19, wherein the substrate comprising fiber and hydroxy-phenoxyether polymer is selected from the group consisting of molded fiber coated with hydroxy-phenoxyether polymer, molded fiber impregnated with hydroxy-phenoxyether polymer, paper coated with hydroxy-phenoxyether polymer, and paper impregnated with hydroxy-phenoxyether polymer.

21. The article of claim 19, wherein the substrate comprising fiber and hydroxy-phenoxyether polymer is molded fiber coated with hydroxy-phenoxyether polymer or paper coated with hydroxy-phenoxyether polymer, and at least one layer of polyester is on a surface coated with hydroxy-phenoxyether polymer.

22. The article of claim 19, wherein the article is paper, wherein the Cobb value is decreased about 5% or more as compared to comparable article.

23. The article of claim 19, wherein the article has a water vapor permeability of about 15 gsm/day or less.

24. The article of claim 19, wherein the article has an oxygen vapor permeability of about $250/cm^3/m^2/day$ or less.

25. The article of claim 19, wherein the tensile strength, flexural strength, or wet flexural strength of the article is increased by about 5% or more as compared to a comparable article.

* * * * *